US006932295B1

(12) United States Patent
Underkofler

(10) Patent No.: US 6,932,295 B1
(45) Date of Patent: Aug. 23, 2005

(54) TAPE REEL FLANGE HAVING AN EFFECTIVE ZERO TAPER

(75) Inventor: Daniel W. Underkofler, Lafayette, CO (US)

(73) Assignee: Storage Technology Corporation, Louisville, CO (US)

( * ) Notice: Subject to any disclaimer, the term of this patent is extended or adjusted under 35 U.S.C. 154(b) by 121 days.

(21) Appl. No.: 10/395,588

(22) Filed: Mar. 24, 2003

(51) Int. Cl.[7] .......................... B65H 23/04; B65H 75/12
(52) U.S. Cl. ............................ 242/548.2; 242/584.4; 242/345.2; 242/614
(58) Field of Search ............................... 242/614, 345, 242/345.2, 327, 325, 348.2, 348.4

(56) References Cited

U.S. PATENT DOCUMENTS

| | | | | |
|---|---|---|---|---|
| 3,669,374 A | * | 6/1972 | Catalano et al. | 242/326.3 |
| 4,168,811 A | * | 9/1979 | Lewis | 242/580.1 |
| 4,932,600 A | * | 6/1990 | Usui et al. | 242/548.4 |
| 5,528,414 A | | 6/1996 | Oakley | 359/257 |
| 5,547,146 A | * | 8/1996 | Kita | 242/548.4 |
| 6,062,500 A | * | 5/2000 | Coles | 242/332.8 |
| 6,141,301 A | | 10/2000 | Oakley | 369/44.23 |
| 6,450,438 B1 | * | 9/2002 | McAllister et al. | 242/548.3 |
| 6,483,797 B1 | | 11/2002 | Oakley et al. | 369/112.01 |
| 6,719,238 B1 | * | 4/2004 | Grant et al. | 242/548.4 |
| 6,783,094 B2 | * | 8/2004 | Morita | 242/614 |
| 6,786,445 B1 | * | 9/2004 | Todd et al. | 242/548.2 |

* cited by examiner

Primary Examiner—Kathy Matecki
Assistant Examiner—Evan Langdon
(74) Attorney, Agent, or Firm—Yee & Associates, P.C.

(57) ABSTRACT

A tape reel within a tape path is disclosed for storing a tape. The tape reel includes a first flange having an inner surface and an outer surface. The first flange is attached to a hub. The tape reel also includes a second flange attached to the hub. The second flange is substantially parallel to the first flange. The second flange has an inner surface and an outer surface. The inner surface of the second flange is tapered with respect to the axis of the hub. The reel is tilted with respect to a plane of the tape path so that the tapered inner surface is moved so that it is located in a plane that is horizontal to a plane of the tape path at the point of exit of the tape from the tape reel.

8 Claims, 2 Drawing Sheets

TAPE REEL FLANGE HAVING AN EFFECTIVE ZERO TAPER

BACKGROUND OF THE INVENTION

1. Field of the Invention

The present invention relates generally to devices which handle machine readable tape wound on a spool or reel, and particularly to a tape reel flange that has an effective zero taper.

2. Background of the Invention:

Magnetic tapes, including reel and cassette-style cartridges and other devices that use magnetic media, are used in many industries to store data, programs, and other information. Magnetic tapes are typically stored on reels or spools, which are cylinders about which the tape is wound, typically having flanges to guide the tape onto the cylinder. Accessing information from a reel or spool of tape typically requires that the spool be inserted into a reading machine, which unwinds the tape from the file spool and winds it onto a temporary storage spool (also referred to as a machine reel or machine spool) until the portion of the tape with the desired information is reached. A magnetic read element reads the information, and the tape is rewound back onto the original file spool and removed from the reader.

A primary objective of tape drive tape path design is to limit the lateral and angular, or skew, motion of the tape as it passes across the read/write head(s). Most of the misalignment and dynamic motions result from vertical motions of the tape at the supply and take-up reels. In particular, the spacing between the flanges on the reels is substantially wider than the tape, especially at the reel outer diameter (OD), which allows the tape to move vertically as it comes on and off the reel. These misalignments must be controlled by tape edge guides, which can result in unacceptable wear on the tape edges.

One approach to correcting this problem has been to pack each wrap of tape to a single fixed flange on each reel. This reel, however, still includes a flange having an industry standard taper which allows for vertical tolerances, tip/tilt tolerance, and runout in the reel. The taper is required in order to avoid ticking or dragging a tape edge on the OD of the reel flange. As the reels fill and empty, the tape pack follows the flange taper and thus is misaligned vertically as a function of pack radius.

Therefore, the current technology would be improved by a tape reel flange that provides an effectively zero taper.

SUMMARY OF THE INVENTION

A tape reel within a tape path is disclosed for storing a tape. The tape reel includes a first flange having an inner surface and outer surface. The first flange is attached to a hub. The tape reel also includes a second flange attached to the hub. The second flange is substantially parallel to the first flange. The second flange has an inner surface and an outer surface. The inner surface of the second flange is tapered with respect to the axis of the hub. The reel is tilted with respect to a plane of the tape path so that the tapered inner surface is moved so that it is located in a plane that is horizontal to a plane of the tape path generally located at the tape exit point from the reel.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The following section describes the present innovations with reference to the drawings. Although specific dimensions are given in these example embodiments, they should not be read to limit the structures to only those sizes listed. They are for example purposes only.

Tape is typically wound on one or two reels in a protective housing, such as a cassette or cartridge. A reel includes a cylindrical hub about which tape is wound to form a tape pack. Flanges are attached to either end of the hub and extend beyond the tape pack to guide and protect the tape. The present invention is a method and system for providing a tape reel having a flange with a zero effect taper.

Elevation change of tape at the reels is a primary tape path concern. Much of the elevation change occurs as a result of spacing between the flanges on the reel. Even if the tape is wound solely against one flange, such as the case when a packing device is used, the tape elevation will change as the reel fills with tape. This results in additional guide forces being required to control lateral position and skew at the tape head.

The present invention greatly reduces the elevation change by providing a reel having a flange taper that is effectively zero at the point that tape enters and exists the reel. The reel of the present invention includes an industry standard taper on one flange, the flange against which the tape is packed. The present invention may be utilized in any type of tape packing system, but will provide the greatest improvements in a tape packing system that packs tape against only one flange of a reel. Thus, as depicted in the figures, tape is packed against only one flange of the reel.

Figure 1:
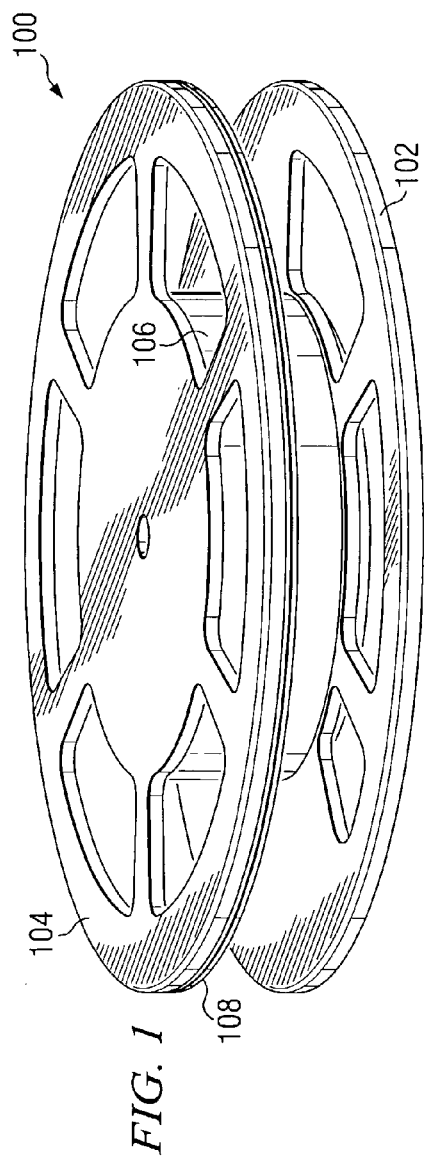
FIG. 1 illustrates a tape reel according to the present invention.

FIG. 1 illustrates a tape reel 100 according to a preferred embodiment. Tape reel 100 includes a lower flange 102 and an upper flange 104. Flanges 102 and 104 are generally parallel to each other, and are perpendicular to a drive hub 106. These flanges are connected to cylindrical drive hub 106 around which tape is wound. A packing device, such as packing flexure 108, is shown beneath upper flange 104. Packing flexure 108 is a thin flexible plate that sits parallel to upper flange 104 and rotates with the flanges and reel itself. Packing flexure 108 is used to cause the tape to be packed against only flange 102.

Figure 2:
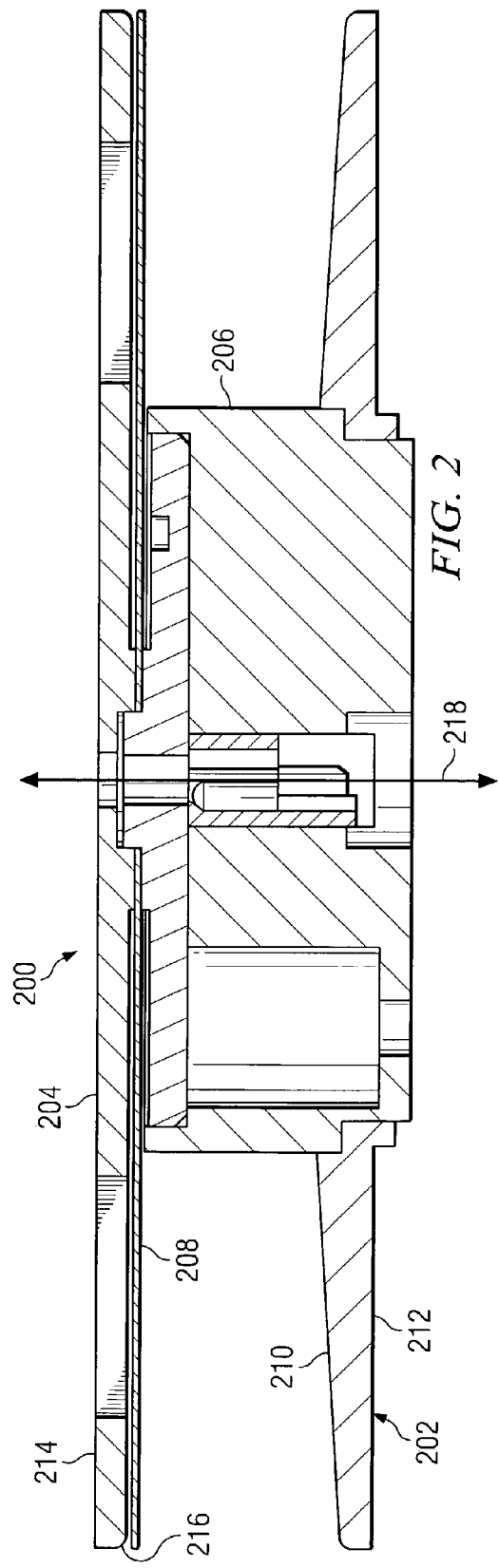
FIG. 2 depicts a sectional view of a reel including a packing device in accordance with the present invention.

FIG. 2 depicts a sectional view of a reel in an undeflected state in which the present invention may be implemented in accordance with the present invention. Lower flange 202 is connected to drive hub 206. Upper flange 204 and packing flexure 208 attach to the opposite end of drive hub 206, with upper flange 204 outside packing flexure 208 and holding packing flexure 208 in position. When employed for its intended use, tape or some type of webbing is wrapped around drive hub 206 between lower flange 202 and packing flexure 208.

Packing flexure 208 and upper flange 204 are preferably parallel and have a small gap between them, allowing some flexing movement of packing flexure 208. In preferred embodiments, packing flexure 208 and the rest of the reel device rotate together.

Lower flange 202 has an inner surface 210 and an outer surface 212. Upper flange 204 has an outer surface 214 and an inner surface 216. Inner surface 210 of lower flange 202 is tapered with respect to the axis 218 of hub 206. In the depicted examples, the amount of the taper angle may vary but is generally an industry standard value. The angle depicted in the figures is greatly exaggerated for the purpose of better describing the present invention.

Figure 3:
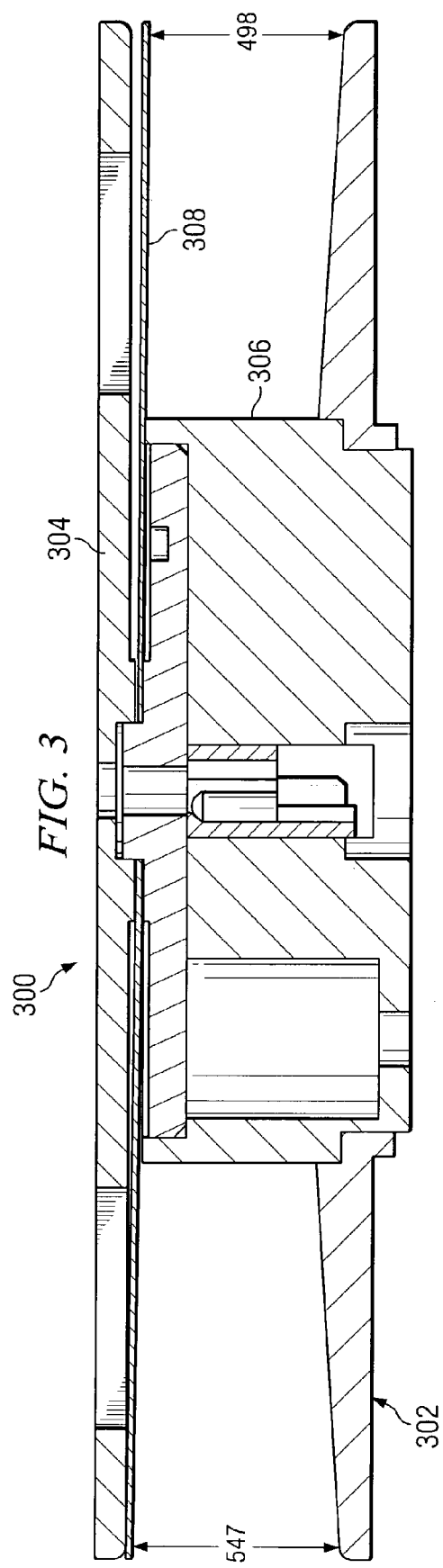
FIG. 3 illustrates a sectional view of a reel including a packing device in accordance with the present invention where the packing device is deflected.

FIG. 3 illustrates a sectional view of reel 300 including a packing device in which the present invention may be implemented in accordance with the present invention where the packing device is deformed as tape is being packed onto reel 300. Packing device 308 is shown in this figure as having been deformed by a force so that part of the flexure is pressed against upper flange 304, while another part of the flexure is pressed against the tape pack (not shown) 306. This results in a gap on the right side of the device which is less than the nominal width of the tape. The flexure presses against the near edge of the tape as the tape is wound, keeping the tape consistently wrapped and preventing stagger of the tape. Since the flexure rotates with the flange and the hub itself, no relative motion is present between the flexure and the tape. The packing device is preferably deflected by a force applied to its tape lead-in edge, or (less preferably) to its tape packing edge, or both.

The flange against which the tape packs, i.e. flange 302, has an industry standard taper, rather than being at right angles to the axis of the hub. Such a design is shown in a very exaggerated fashion in FIGS. 2, 3, and 5. This taper to the packing surface means that a slight taper exists in the tape pack as it is being packed.

Figure 4:
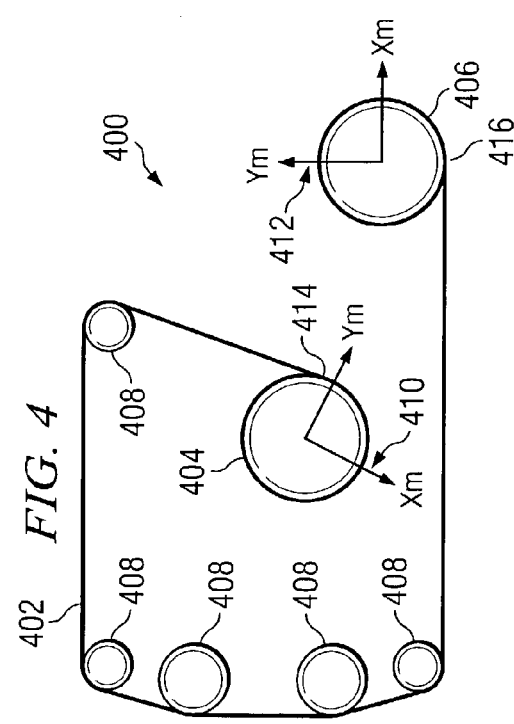
FIG. 4 depicts a simplified view of a tape path including a machine reel and a file reel which are tilted according to the present invention.

FIG. 4 depicts a simplified view of a tape path 400 in accordance with the present invention. Tape 402 is wound between a machine reel 404 and a file reel 406 utilizing guides 408. Tape 402 enters and exits reel 404 at point 414. Tape 402 enters and exits reel 406 at point 416. Machine reel 404 and file reel 406 are each tilted about their respective x-axes in a positive z-axis direction. The reels are tilted by an amount that is equal to the angle of their respective taper surfaces. Reel 404 is tilted about the x-axis of coordinate system 410 in a direction such that the tapered flange becomes horizontal at the tape exit location 414. Reel 406 is tilted about the x-axis of coordinate system 412 in a direction such that its tapered flange becomes horizontal at point 416.

Tape path 400 is in a plane that is perpendicular to a z-axis. Prior to being tilted, the tapered surface of the tapered flange in the reel is located in a plane that is slanted and not perpendicular to the z-axis. According to the present invention, each reel is tilted with respect to the z-axis. After being tilted in accordance with the present invention, a portion of the tapered surface of the flange at the tape entry/exit point is located in a plane that is perpendicular to the z-axis. This plane is coincident with the plane of the paper.

Figure 5:
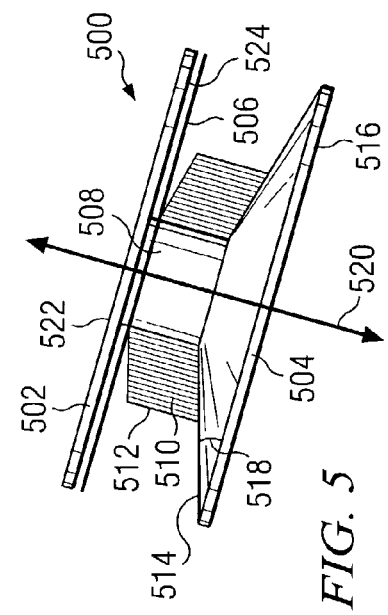
FIG. 5 illustrates a sectional view of a reel that is tilted in accordance with the present invention.

FIG. 5 illustrates a sectional view of a reel 500 that is tilted in accordance with the present invention. Reel 500 includes an upper flange 502 and a lower flange 504. A packing device 506 is included below upper flange 502. Upper flange 502, lower flange 504, and packing device 506 are attached to hub 508. Tape is wound around hub 508 to form tape pack 510. Tape enters and exits reel 500 at 512 in a plane that is perpendicular to the plane of the paper. Lower flange 504 has an inner surface and an outer surface 516. The inner surface is tapered with respect to an axis 520 of hub 508. Upper flange 502 has an outer surface 522 and an inner surface 524.

Reel 500 is tilted about its x-axis in the clockwise direction. Thus, prior to being tilted, surfaces 522, 524, and 516 were each in planes that were horizontal to the plane of the tape path. Thus, they were in planes that were perpendicular to the z-axis.

After being tilted, surfaces 522, 524, and 516 are now in planes that are no longer perpendicular to the z-axis. After being tilted, a line 514 along the inner surface of flange 504 at the tape entry/exit point is horizontal to the plane of the tape path. Line 514 is thus now located in a plane that is perpendicular to the z-axis.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A tape reel within a tape path for storing a tape, said reel comprising:
   a first flange attached to a hub, said hub having a first axis, said first flange being perpendicular to said first axis;
   a second flange attached to the hub, the second flange being substantially parallel to the first flange and perpendicular to said first axis;
   the second flange having a tapered inner surface, said tapered inner surface being tapered with, respect to said first axis of said hub; and
   said reel being tilted with respect to a plane of said tape path so that said inner surface is located in a plane that is horizontal to a plane of said tape path at a point where said tape exits said reel;
   said first flange having an inner surface and an outer surface;
   said second flange having an outer surface;
   said inner surface and said outer surface of said first flange and said outer surface of said second flange all being located in planes that are generally horizontal to said plane of said tape path prior to said reel being tilted; and
   a packing device coupled to said hub below said first flange and above said tape for packing said tape against only one flange.

2. The reel according to claim 1, further comprising:
   said tape being packed against only one flange of said reel.

3. The reel according to claim 1, further comprising:
   said tape being packed against only said second flange of said reel.

4. The reel according to claim 1, further comprising:
said inner surface and said outer surface of said first flange and said outer surface of said second flange all being located in planes that are tilted with respect to said plane of said tape path after said reel is tilted.

5. The reel according to claim 1, further comprising:
said tapered inner surface being tapered with respect to said first axis of said hub at a taper angle; and
said reel being tilted at said taper angle with respect to said plane of said tape path.

6. A method for packing tape on a tape reel, said method comprising:
tilting said reel with respect to a plane of said tape path so that an inner surface of a second flange included in said reel is located in a plane that is horizontal to a plane of said tape path at a point where said tape enters and exits said reel;
said reel including a first flange attached to a hub, said hub having a first axis, a second flange attached to the hub, the second flange being substantially parallel to the first flange and perpendicular to said first axis, the second flange having a tapered inner surface, said tapered inner surface being tapered with respect to said first axis of said hub, said first flange including an inner surface and outer surface that are parallel to an outer surface of said second flange, said inner and outer surface of said first flange and said outer surface of said second flange being tilted with respect to said horizontal plane; and
packing said tape against only said second flange using a packing device that is coupled to said hub below said first flange and above said tape.

7. The method according to claim 6, further comprising the step of tilting said reel from a position where said outer surface of said second flange are all located in planes that are generally horizontal to said plane of said tape path to a position where said inner surface and said outer surface of said first flange and said outer surface of said second flange are all located in planes that are tilted with respect to said plane of said tape path.

8. The method according to claim 6, wherein said tapered inner surface are tapered with respect to said first axis of said hub at a taper angle, further comprising the step of tilting said reel at said taper angle with respect to said plane of said tape path.

* * * * *